United States Patent [19]

DeFrees

[11] 4,126,294
[45] Nov. 21, 1978

[54] ADAPTER VALVE MECHANISM FOR TRANSPORTATION TANK

[76] Inventor: Joseph H. DeFrees, 505 Liberty St., Warren, Pa. 16365

[21] Appl. No.: 633,629

[22] Filed: Nov. 20, 1975

[51] Int. Cl.² .................................................. F16K 35/02
[52] U.S. Cl. ................................... 251/99; 141/113;
251/104; 251/110; 251/149.6; 251/251;
251/367; 285/178
[58] Field of Search ............. 137/322, 522, 542, 543,
137/543.13, 149.6; 251/259, 318, 323, 99, 107,
251, 102, 144, 142, 148, 152, 96, 98, 110, 367,
104; 26/157.1; 29/156.8 CF; 141/113; 285/178

[56] References Cited

U.S. PATENT DOCUMENTS

| | | | |
|---|---|---|---|
| 735,549 | 8/1903 | Menking | 251/144 |
| 1,062,112 | 5/1913 | Petro | 251/259 |
| 1,106,633 | 8/1914 | Denehie | 251/259 |
| 1,125,342 | 1/1915 | King | 137/543.13 |
| 1,673,293 | 6/1928 | McBride | 251/323 |
| 2,356,360 | 8/1944 | Smolensky | 251/367 |
| 2,384,628 | 9/1945 | Krone et al. | 137/410 |
| 2,594,641 | 4/1952 | Griffith et al. | 137/543 |
| 2,706,649 | 4/1955 | Foushee, Jr. | 285/178 |
| 2,740,423 | 4/1956 | Stillwagon | 251/96 |
| 2,753,884 | 7/1956 | Lindsay | 137/542 |
| 2,804,281 | 8/1957 | Osburn | 137/543 |
| 2,875,976 | 3/1959 | Harwood | 251/102 |
| 2,909,192 | 10/1959 | Dobrick | 137/542 |
| 2,950,837 | 8/1960 | Christensen et al. | 251/178 |
| 3,097,666 | 7/1963 | Antrim et al. | 137/543.13 |
| 3,129,718 | 4/1964 | Schlensker | 137/542 |
| 3,148,704 | 9/1964 | Blass | 251/99 |
| 3,228,415 | 1/1966 | Geiss | 251/101 |
| 3,329,394 | 7/1967 | Overbaugh | 251/99 |
| 3,507,581 | 4/1970 | Jensen | 29/156.8 CF |
| 3,551,007 | 12/1970 | Martin et al. | 285/178 |
| 3,631,893 | 1/1972 | Seaman et al. | 251/259 |
| 3,643,580 | 2/1972 | Siegel | 285/178 |
| 3,845,781 | 11/1974 | Hansen et al. | 137/542 |

FOREIGN PATENT DOCUMENTS

| | | | |
|---|---|---|---|
| 434,038 | 9/1926 | Fed. Rep. of Germany | 251/149.6 |
| 254,542 | 8/1927 | Italy | 251/104 |

Primary Examiner—Martin P. Schwadron
Assistant Examiner—G. L. Walton
Attorney, Agent, or Firm—Baldwin, Egan, Walling & Fetzer

[57] ABSTRACT

A fabricated adapter valve for mounting on the exterior of a transportation tank for liquid, such as for instance gasoline or oil, providing for coupling with a compatible loading coupler of a loading island, for loading the liquid into the transportation tank. The valve arrangement provides an adapter coupler section having an exterior coupling configuration as defined by the American Petroleum Institute, for universal coupling with loading couplers of a loading station, and a valve which is of smaller size and less weight, having fewer places to leak and possessing fewer parts, and therefore more economical to manufacture, as compared to prior art valve arrangements.

11 Claims, 7 Drawing Figures

ADAPTER VALVE MECHANISM FOR TRANSPORTATION TANK

Various arrangements of adapter valves are known in the prior art for loading of a transportation tank. However, many times these adapter valves require undue maintenance, and are quite heavy, thereby cutting into the carriable load of the transportation tank. Moreover, such prior art valves usually have pockets formed therein due to their structural arrangement, and in which pockets, liquid is often times trapped, and therefore complete drainage of these prior art adapter valves does not occur upon termination of the loading operation.

SUMMARY OF THE INVENTION

The present invention provides adapter valve arrangements of fabricated construction, of relatively simple lightweight construction, and which effectively provides for the loading of liquids into a transportation tank.

Accordingly, an object of the invention is to provide a novel adapter valve for use with a transportation tank for liquids, such as an inflammable liquid.

Another object of the invention is to provide a valve of the aforementioned type which is relatively lightweight and of a relatively smaller size, as compared to heretofore known adapter valves, and which is of a fabricated construction.

Another object of the invention is to provide a valve of the above type which facilitates drainage of the valve upon completion of the loading operation.

A still further object of the invention is to provide an adapter valve arrangement including an internal poppet and wherein the poppet is accessible for repair from outside of the valve, without removing the valve from the tank vehicle or requiring the necessity of taking the valve apart.

Other objects and advantages of the invention will be apparent from the following description taken in conjunction with the accompanying drawings wherein:

BRIEF DESCRIPTION OF PREFERRED EMBODIMENTS

Figure 1:
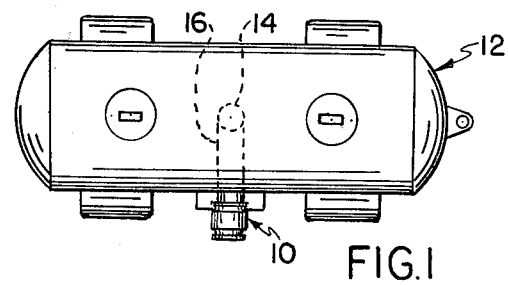
FIG. 1 is a diagrammatic illustration of a typical installation of an adapter valve of the invention on a transportation tank vehicle.

Referring now again to the drawings, there is shown diagrammatically in FIG. 1 an adapter valve 10 embodying the invention and as mounted on a liquid transportation tank 12. Associated with the lower portion of the tank may be an emergency valve 14 of known construction, such as for instance the type illustrated in U.S. Pat. No. 3,029,833 to Joseph H. DeFrees, dated Apr. 17, 1962. The emergency valve 14 may be coupled by means of a conduit or line 16 to the adapter valve structure of the invention, with line 16 having a flange 18 thereon (FIG. 2) adapted for coupling to the flanged portion 20 of the adapter valve. The flange 18 of line 16 can be coupled as by means of the threaded fasteners 22 illustrated, received in complementary threaded openings 23 (FIG. 3) in the flange portion 20, and a sealing gasket 23a is preferably provided between flanges 20 and 18.

Adapter valve 10 includes section 24 which has a coupling portion 24a having an exterior configuration as established by the American Petroleum Institute, and which is adapted for rapid coaction with a compatible loading coupler of a conventional loading island for liquids to be transported by storage tank 12. Such loading island conventionally includes a loading assembly comprising an arm having a loading coupler on one end thereof for liquid tight coupling coaction with the coupling portion area 24a of the adapter valve, thus providing for applying liquid under pressure to the adapter valve, from whence it flows via line 16 and the emergency valve 14 into the tank interior during a bottom loading operation. The loading coupler at the loading island may have conventional means associated therewith, for manually opening the poppet valve structure 26 (FIG. 2) mounted interiorly of the adapter valve 10, for permitting the ready inflow of the liquid into the body portion 28 of the adapter valve and then out the liquid exit opening 30 in the flange portion 20, to the aforementioned line 16.

As can be seen, body 28 of the adapter valve is preferably of cylindrical open ended configuration, which is secured at one end thereof, as by means of welds 32, to the coupling portion 24, in liquid tight relation. At its other end, body 28 is secured as by welds 34, to the aforementioned flange portion 20. Liquid inlet opening 36 in the coupling portion 24 is normally closed by the aforementioned poppet 26, which is maintained in position by a fabricated spider 38.

Spider 38, in the embodiment illustrated, comprises three relatively thin arms 40, each of which includes a tab portion 40a received in complementary slot 42 in the body portion 28 of the valve. Preferably, welds 44 provide a liquid tight connection between the spider arms and the body portion, and rigidly position spider 38.

Arms 40 support a lengthwise extending sleeve 46 thereon, which is connected preferably as by welds 48, to the arms. The elongated base stem 50 of the poppet 26 is received interiorly of the sleeve 46, and in ready sliding, guided relation therein.

A spring 52 coacting between the rear face 54 of the poppet head and the well 56 formed by the arms 40, urges the poppet head toward closed position. Pin 56a connects the poppet head to the stem 50.

Figure 2:
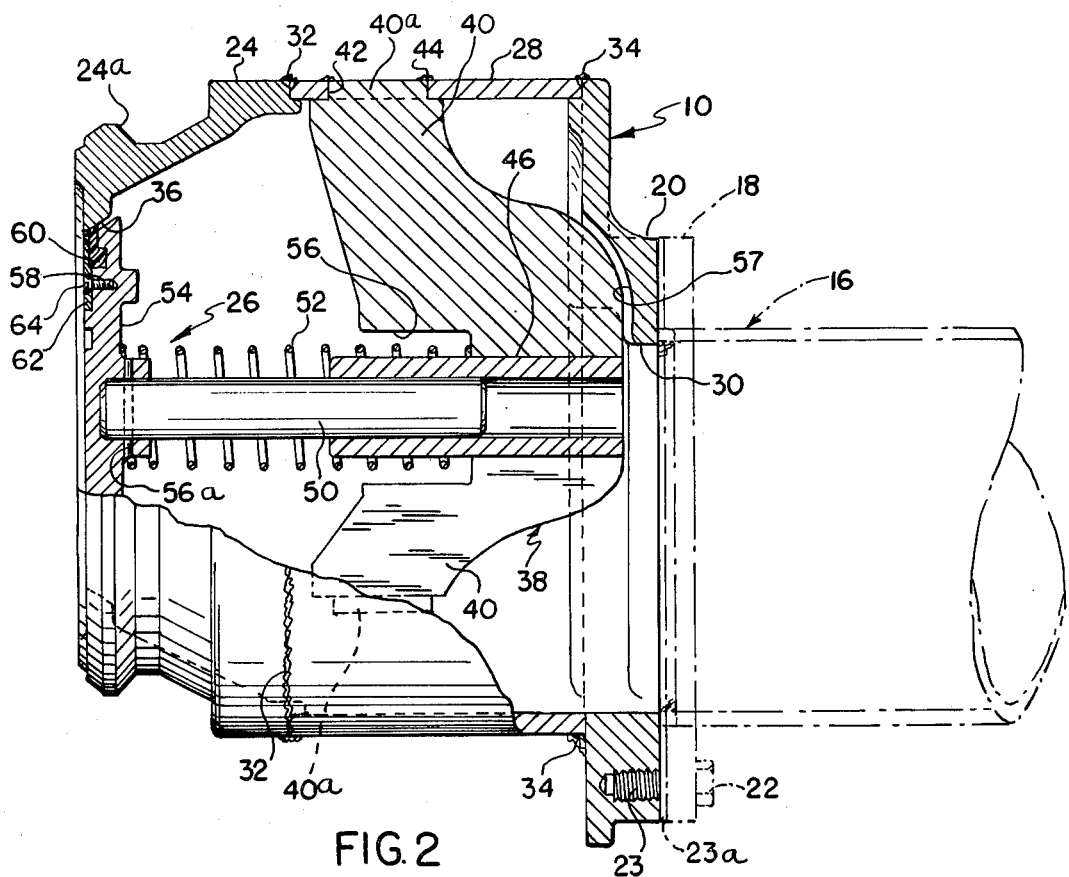
FIG. 2 is a partially broken, enlarged side elevational view of an adapter valve embodying the invention.

In this embodiment of adapter valve, the axis of exit opening is eccentrically disposed relative to the axis of inlet opening 36, and the lower extremity of liquid exit opening 30 of the valve is generally coplanar with the lower inner extremity of the body portion 28 of the valve, as shown in FIG. 2, so that no retaining pockets are formed in the valve in which liquid can inadvertently collect or be retained upon completion of the loading operation, and consequently substantially complete draining of the valve is facilitated. Flange 20 has recess 57 therein for receiving associated arm 40 (FIG. 2).

The poppet valve 26 on its forward face is preferably provided with a circumferential, step-like recess 58 therein, as illustrated, in which there is disposed an L-shaped (in transverse section) sealing ring 60, held in place by a circular retainer plate 62, which in turn is detachably secured, as by means of threaded fasteners 64, to the valve head. It will be seen that access to the sealing ring 60 is readily accessible from exteriorly of the adapter valve, thus providing for replacement of the sealing ring if necessary. The deep tapered defining surface of the inlet opening 36 into the adapter valve helps to prevent the poppet from binding during opening movement of the poppet valve away from the liquid entry opening. Also, such a deep tapered seat aids in providing a seal with the poppet head in the event the sealing ring 60 was damaged or lost.

Figure 3:
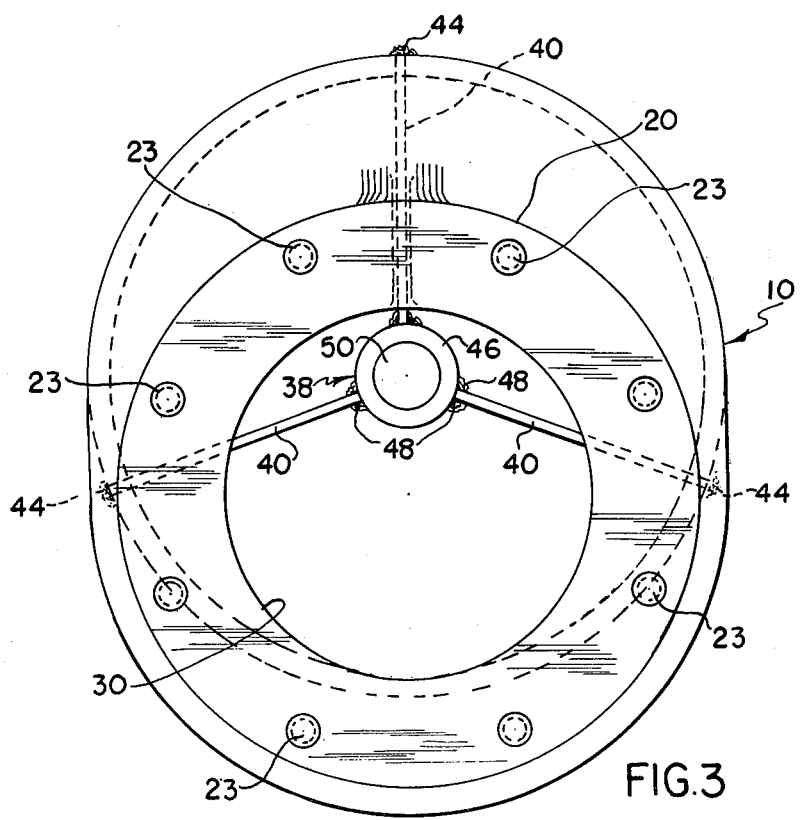
FIG. 3 is an end view of the adapter valve taken generally along the plane of line 3—3 of FIG. 2 looking in the direction of the arrows.

The exterior configuration of the valve 10 is generally uninterrupted as can be thus seen in FIG. 3, aiding in preventing accumulation of ice and dirt on the outside of the valve while the transportation tank is in service.

It will be seen that while the spider 38 effectively maintains the poppet valve in position in the interior of the adapter valve and in alignment with the inlet opening 36, it presents little interruption to the volume flow of liquid through the adapter valve, and this is so even though the axis of the exit opening 30 from the valve is disposed at a lower elevation with respect to the axis of the inlet opening 36 into the valve. In fact, the spider assembly 38 mounting the poppet valve thereon serves as a vortex breaker, and actually facilitates smooth flow of liquid into the transportation tank during the loading operation.

The valve parts from which the valve is fabricated, including the body portion and end coupling and flange portions, are preferably formed of some lightweight material, such as for instance aluminum, which increases the net work load of product that the mobile transportation tank is able to carry, thus making a more economical arrangement of transportation tank.

Figure 4:
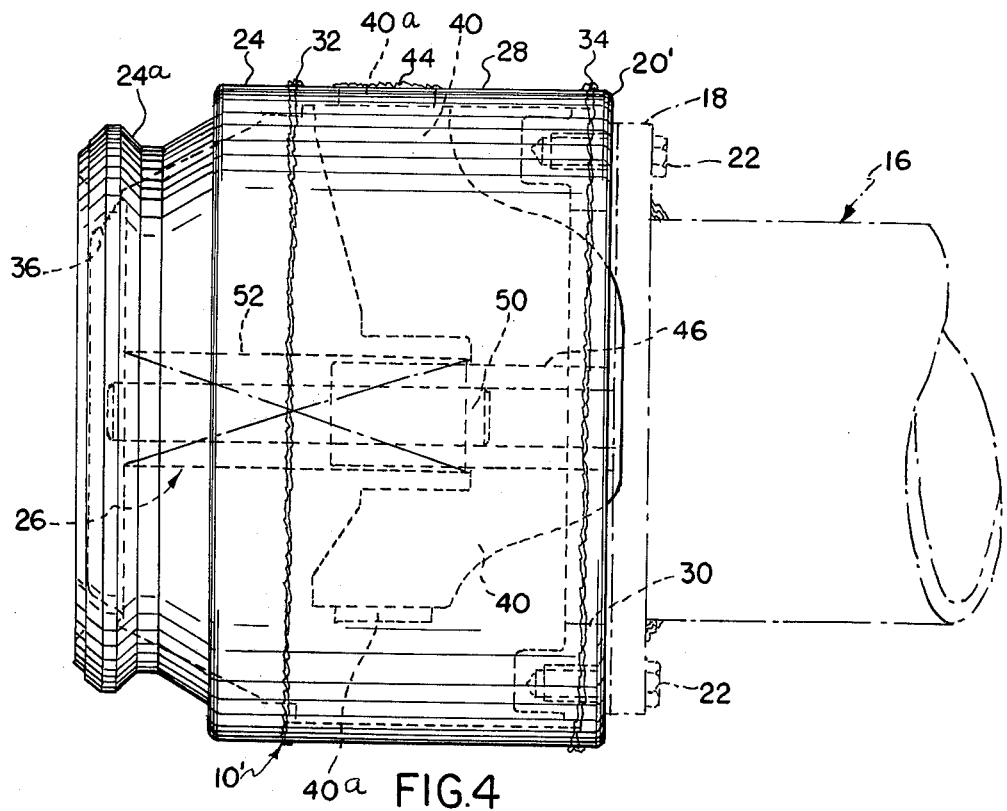
FIG. 4 is a view generally similar to FIG. 2, but illustrating a modified form of adapter valve wherein the discharge or exit opening in the valve is concentrically disposed with respect to the liquid entry or inlet opening in the valve.
Figure 5:
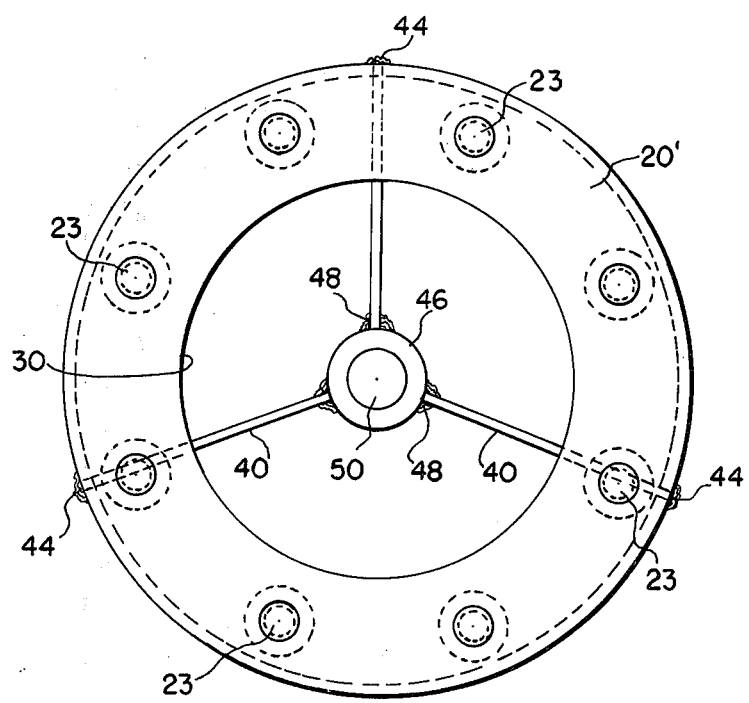
FIG. 5 is an end elevational view taken generally along the plane of line 5—5 of FIG. 4 looking in the direction of the arrows.

Referring now to FIGS. 4 and 5, there is illustrated a modified arrangement of adapter valve with like parts thereof being designated by like reference numbers. In this arrangement however, the flange portion 20' of the valve is concentrically formed with respect to the body portion 28 of the adapter valve, and with the axis of the exit opening 30 in the flange portion 20' generally aligned with the axis of the inlet opening 36 in the coupling portion 24 of the valve. Thus, it will be seen that in this adapter valve arrangment, a pocket does exist in the lower portion of the valve as mounted on the transportation tank, wherein liquid may collect after the completion of the loading operation, and thus complete drainage of the valve may not occur. In other respects, this adapter valve arrangment is generally similar to the first described embodiment.

Figure 6:
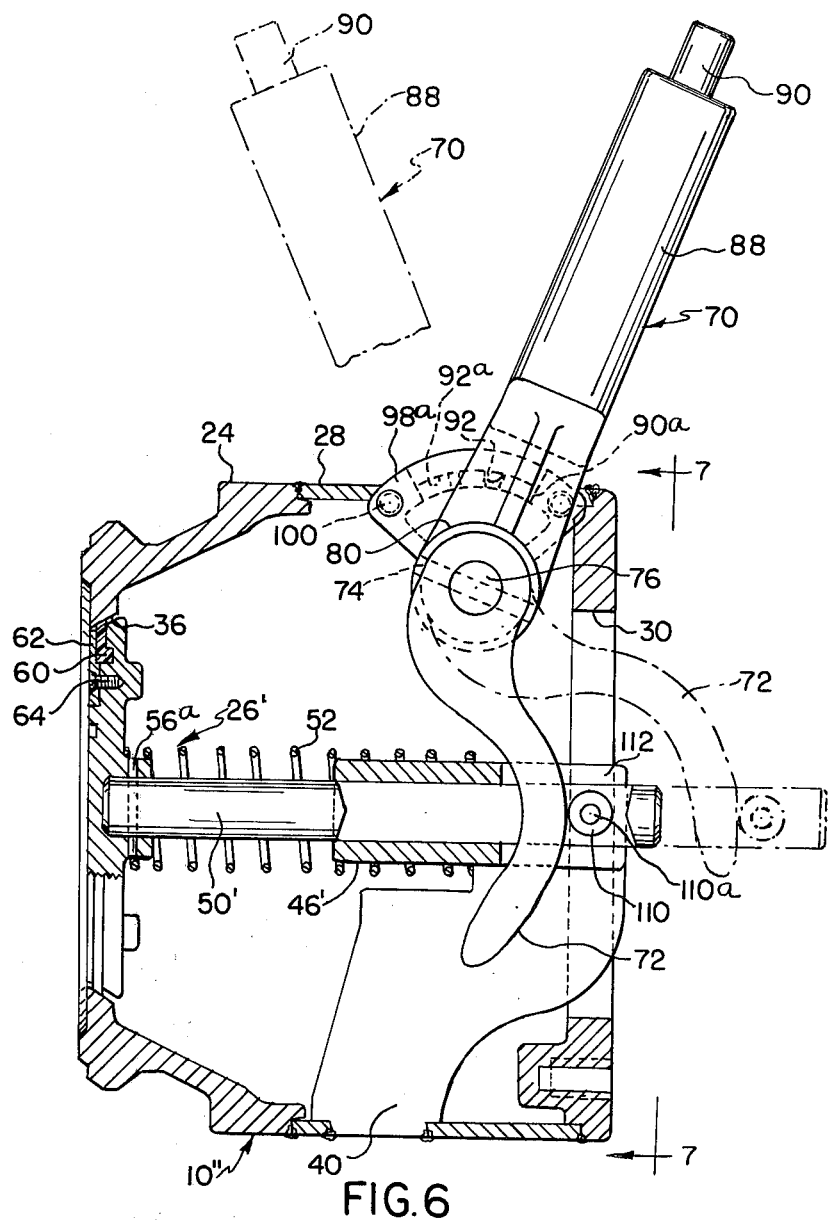
FIG. 6 is a side elevational view generally similar to FIG. 2, but showing a modified form of the invention, including a manually actuatable opener for the poppet of the valve.
Figure 7:
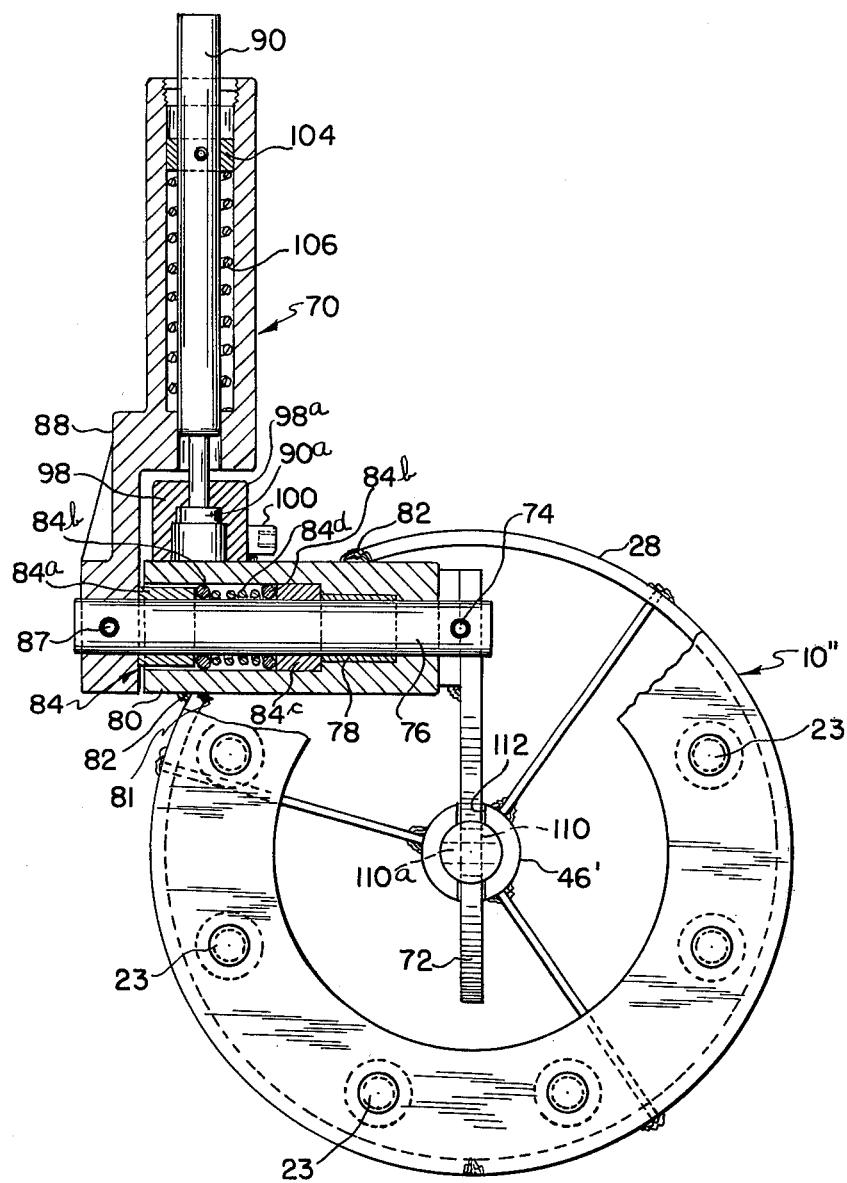
FIG. 7 is a view taken generally along the plane of line 7—7 of FIG. 6 looking in the direction of the arrows.

Referring now to FIGS. 6 and 7 there is illustrated a manually openable adapter valve, with the basic construction of the valve being generally similar to that illustrated in FIGS. 4 and 5, but which also includes a manually operable lever mechanism 70 coacting with the poppet structure 26' for manually opening the poppet. This adapter valve arrangement would be useful, for instance, if it is desirable to manually open the poppet of the adapter valve during loading of the transportation tank or if it is desired to use the adapter valve as an unloading valve when the adapter portion 24 of the adapter valve is coupled to a discharge hose (not shown) equipped with a compatible coupling head, for unloading the transportation tank via the adapter valve, thus utilizing the latter as an outlet valve.

The manual actuator 70 includes a cam arm 72 of smoothly curved configuration. Cam 72 may be secured as by means of pin 74 (FIG. 7) to shaft 76 which is rotatably journaled as by means of sleeve bearing 78, in stuffing box body 80, which projects laterally outwardly through opening 81 of the body portion 28 of the adapter valve. Body 80 can be sealed as by welds 82, in liquid tight relation to the valve body 28. Packing 84 assembly may include a follower 84a, O-rings 84b, a packing seal 84c, together with a spring 84d, to prevent leakage of liquid along the shaft 76. The outer end of shaft 76 projects outwardly beyond the stuffing box body 80, and is connected as by means of a pin 87, to operating handle 88 which extends upwardly above the adapter valve 10".

The operating handle 88 comprises a plunger 90 having an enlarged lower end 90a, which is adapted to engage in one or the other of at least two socket chambers 92, 92a (FIG. 6) in two-piece housing 98, 98a.

Housing section 98a is secured to section 98 as by means of socket screws 100. When the enlarged end 92 of plunger 90 is in socket 92, the cam 72 is in inactive position (as shown in full lines in FIG. 6) and the poppet 26' is closed by the action of spring 52. To release the plunger, the latter is depressed, thus depressing or forcing the collar 104 attached to the plunger 90 downwardly against the resistance to compression of the spring 106, to release the enlarged end 90a from socket 92. Pivoting of the handle 88 about the lengthwise axis of shaft 76 will swing the handle to the forward actuated position (shown in phantom lines in FIG. 6) and upon release of the plunger 90, the spring 106 will move the plunger upwardly, causing the enlarged end 90a of the plunger to enter the socket 92a in the housing assembly 98, 98a, thus positioning the cam 72 in the rearward phantom-line position illustrated in FIG. 6 and maintaining the poppet in open condition.

In this connection, the base shaft 50 of the poppet includes a preferably movable abutment, such as for instance rotatable roller 110 thereon, which may be rotatably mounted as by means of a pin 110a to the base stem and in slot 112 formed in the stem. The roller porvides a movable abutment for the confronting curved actuating surface of the cam 72, so that the stem and associated poppet may be smoothly moed rearwardly upon actuation of the operating handle 88, to the phantom lined position illustrated. Upon release of the operating handle from the phantom line position, by depression of the plunger 90 and release of handle 88, the spring 52 of the poppet automatically moves the poppet to closed position as illustrated in full lines in FIG. 6. As can be seen from FIG. 7, the packing assembly 84 including the packing seal 84c, can be replaced from externally of the adapter valve, in the event that the latter becomes necessary. Likewise, the sealing ring 60 on the poppet can be replaced from exteriorly of the valve, similarly to the first described embodiment.

The actuator mechanism parts of this valve arrangement are preferably formed of some lightweight material, such as for instance aluminum, similarly as the other parts of the valve and may be assembled and welded into the finalized valve arrangement illustrated. It will be seen that in the three embodiments of adapter valves shown in the drawings, many of the parts are interchangeable, thus facilitating repair of the valves and requiring stocking of a smaller number of repair parts of the different embodiments of the valves.

From the foregoing description and accompanying drawings it will be seen that the invention provides novel adapter valve arrangements for mounting on the exterior of a transportation tank for liquid, such as for instance gasoline or oil, which provides for expeditious coupling with a compatible loading coupler at a loading island, and which valve arrangements possess a smaller size and are of less weight and fewer parts, as compared to valves heretofore known. The invention also provides an adapter valve wherein the flow of liquid through the valve is maximized by having minimum structure interference in the flow passageway through the valve, while still providing for effective closing of the liquid entry opening to the adapter valve.

The terms and expressions which have provides used are used as terms of description and not of limitation, and there is no intention in the use of such terms and moved of excluding any equivalents of any of the features shown or described, or portions thereof, and it is recognized that various modifications are possible within the scope of the invention claimed. 84c,

What is claimed is:

1. A fabricated adapter valve adapted for loading of a transportation storage tank comprising, a hollow body portion, a coupling portion secured to one end of said body portion in liquid tight relation, said coupling portion being adapted for coupling to a compatible loading coupler of a loading island for liquids, a coupling flange secured in liquid tight relation to the other end of said body portion, adapted for coupling to a liquid flow conduit to the tank, said flange defining an exit opening adapted for communication with the liquid flow conduit, said coupling portion having a liquid inlet opening therein, said coupling portion comprising a frontal surface disposed generally perpendicular to the axes of said inlet opening and said exit opening, said inlet opening defining a poppet valve seat disposed generally immediately adjacent to the plane of said frontal surface, said body portion comprising an open-ended cylindrical tube and said coupling portion and said flange being secured by welds to said tube at the respective end thereof to form a liquid tight connection therebetween, valve means mounted in said body portion for closing said inlet opening, said valve means including means automatically urging said valve means forwardly toward closed condition in said inlet opening, a spider mounted interiorly of said body portion, said spider comprising spaced generally radially extending arms supporting an elongated sleeve generally centrally of said body portion, said sleeve being secured by welds to said arms, said valve means comprising a poppet movably mounted on said sleeve interiorly of said body portion. And wherein said poppet includes an elongated stem received in sliding guided relation in said sleeve for mounting the poppet in said body portion, each of said arms including a tab on the outer end thereof, said body portion having complementary slots formed therein extending therethrough and receiving therein the respective of said tabs, and means sealing said tabs with respect to said slots to prevent escape of liquid from the interior of said adapter valve during flow therethrough, said sealing means comprising exterior welds securing the tabs to said body portion and sealing the respective slot, and rigidly positioning said spider interiorly of said body portion with said poppet in alignment with said inlet opening, said slots and coacting tabs being disposed forwardly of the connections of said sleeve to said arms with said arms being generally obliquely oriented, in elevation, in said body portion, said poppet including a head having a sealing ring thereon engageable with said poppet seat, and means securing the sealing ring in position on the poppet head, the last mentioned means being located in confronting relation to said plane and being exteriorly accessible from said valve and said inlet opening for convenient replacement of the sealing ring on the poppet head.

2. A valve in accordance with claim 1 wherein the parts of said valve are formed of aluminum, said welds securing the aluminum parts together into a complete valve.

3. A valve in accordance with claim 1 wherein the axis of said exit opening in said flange is eccentrically disposed in a downward direction with respect to the axis of said inlet opening, whereby the lowermost defining section of said exit opening is substantially coplanar with the lowermost inner surface of said body portion, thereby eliminating the formation of any liquid retaining pocket in said body portion adjacent said flange so that complete drainage of the valve is facilitated upon completion of a tank loading operation.

4. A valve in accordance with claim 1 including a manually operable actuator mounted on said body portion and extending interiorly thereof and accessible for actuation from exteriorly thereof, said actuator including means pivotal in said body portion about a fixed point relative to said body portion and coacting with said valve means for manually opening said valve means, and means for selectively maintaining said valve means in open condition while permitting release of said actuator by an operator.

5. A valve in accordance with claim 1 wherein said spider arms define a well, said automatic means comprising a coil spring encompassing said stem and said sleeve, said well receiving one end of said spring, the other end of said spring abutting the head of said poppet and urging the latter toward said closed condition, the forward end of said sleeve projecting forwardly of said well.

6. A fabricated adapter valve adapted for loading of a transportation storage tank comprising, a hollow body portion, a coupling portion secured to one end of said body portion in liquid tight relation, said coupling portion being adapted for coupling to a compatible loading coupler of a loading island for liquids, a coupling flange secured in liquid tight relation to the other end of said body portion adapted for coupling to a liquid flow conduit to the tank, said flange defining an exit opening adapted for communication with the liquid flow conduit, said coupling portion having a liquid inlet opening therein, said coupling portion comprising a frontal surface disposed generally perpendicular to the axes of said inlet opening and said exit opening, said inlet opening defining a poppet valve seat disposed generally immediate adjacent to the plane of said frontal surface, said body portion comprising an open ended cylindrical tube, and said coupling portion and said flange being secured by welds to said tube at the respective end thereof to form a liquid tight connection therebetween, valve means mounted in said body portion for closing said inlet opening, said valve means including means automatically urging said valve means toward closed condition, the axis of said exit opening being eccentrically disposed with respect to the axis of said inlet opening whereby the lowermost defining section of said exit opening is substantially coplanar with the lowermost inner surface of said body portion, thereby eliminating the formation of a liquid retaining pocket in said body portion adjacent to said flange so that complete drainage of the valve can occur upon completion of a tank loading operation, a spider mounted interiorly of said body portion, said spider comprising spaced generally radially extending arms supporting an elongated sleeve generally centrally of said body portion in a direction transverse of said body portion, said sleeve being secured by welds to said arms, said valve means comprising a poppet movably mounted on said sleeve interiorly of said body portion and wherein said poppet includes an elongated stem received in guided relation with respect to said sleeve for mounting the poppet in said body portion, each of said arms including a tab on the outer end thereof, said body portion having complementary slots formed therein extending therethrough and receiving therein the respective of said tabs, and means sealing said tabs with respect to said slots to prevent escape of liquid from the interior of said adapter valve during flow therethrough, said sealing means comprising exterior welds securing the tabs to said body portion and sealing the respective slot and rigidly positioning said spider interiorly of said portion with said poppet in alignment with said valve seat, said slots and coacting tabs being disposed forwardly of the connections of said sleeve to said arms and said arms being generally obliquely oriented in elevation in said body portion.

7. In combination, a transportation tank and a fabricated adapter valve for controlling flow of liquid to said transportation tank, including means mounting said valve exteriorly of the tank, and means connecting said valve to the tanks interior, said valve comprising a hollow cylindrical tube body portion open at opposite ends thereof, an adapter coupling section secured by welds in liquid tight relation to one end of said body portion, said adapter section being adapted for coupling to a compatible loading coupler of a loading island for liquids, and a flange coupling secured by welds in liquid tight relation to the other end of said body portion, said flange coupling being coupled to said means connecting said valve to the tank's interior, said flange coupling defining an exit opening in said valve communicating with said connecting means, and said adapter section defining a liquid inlet opening into said valve, said adapter section comprising a frontal surface disposed generally perpendicular to the axes of said inlet opening and said exit opening, said inlet opening defining a poppet valve seat disposed generally immediately adjacent to the plane of said frontal surface, poppet valve means mounted interiorly of said body portion and normally closing said inlet opening to said valve by engagement with said valve seat, means automatically urging said poppet means toward closed condition in said inlet opening, a spider mounting said poppet means in said valve, said spider comprising relatively thin arm portions radiating off from a generally central sleeve portion and connected by welds thereto, each of said arm portions having a tab on the outer end thereof, said body portion having complementary slots formed therein extending therethrough, and receiving a respective of said tabs for mounting the arm portions to said body portion, and weld means sealing said tabs with respect to said slots to prevent escape of liquid from the interior of said valve during passage of liquid through said valve and for rigidly positioning said spider in said body portion for alignment of said poppet valve means with said inlet opening, said slots and coacting tabs being disposed forwardly of the connections of said sleeve portion to said arm portions with said arm portions being generally obliquely oriented, in elevation, in said body portion, said poppet means including a head having a recess formed therein, a sealing ring disposed in the recess and projecting laterally of said head, and means securing the sealing ring in position with respect to said head, said sealing ring being adapted to engage said valve seat for sealing the inlet opening against escape of liquids, and said securing means being located in confronting relation to said plane and being accessible through said inlet opening from exteriorly of said valve for replacement of said sealing ring from exteriorly of said valve.

8. The combination in accordance with claim 7 wherein the axis of said exit opening in said coupling flange is eccentrically disposed with respect to the axis of said inlet opening, with the lowermost defining extremity of the exit opening being substantially co-planar with the lowermost interior extremity of said body portion, whereby drainage of the valve is facilitated upon completion of a loading operation on said tank.

9. The combination in accordance with claim 7 wherein the axis of said exit opening is aligned with the axis of said inlet opening.

10. The combination in accordance with claim 7 wherein said poppet means includes a rearwardly extending stem slidingly mounted in said sleeve portion, and including a manually operable actuator mounted on said valve, said actuator comprising an operating handle accessible from exteriorly of said valve, said actuator including an arcuate cam extending interiorly of said body portion, said cam being pivotal about a fixed point in said body portion and coacting with a slot in the poppet stem and a roller mounted on the stem, for moving the poppet rearwardly against the resistance to compression of said automatic urging means, said actuator including means for selectively maintaining said poppet in open condition, the last mentioned means comprising a plunger mounted on said handle of the actuator and a recess in which the one end of said plunger is received for locking the plunger in selected position.

11. The combination in accordance with claim 10 including sealing means coacting with the actuator for preventing leakage of liquid along the actuator from interiorly of said valve.

* * * * *